US011721337B2

United States Patent
Gunther (10) Patent No.: US 11,721,337 B2
(45) Date of Patent: *Aug. 8, 2023

(54) PROXIMITY AWARE VOICE AGENT (71) Applicant: HARMAN INTERNATIONAL INDUSTRIES, INCORPORATED, Samford, CT (US)

(72) Inventor: Craig Gunther, Salt Lake City, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 463 days.

This patent is subject to a terminal disclaimer.

(21) Appl. No.: 16/932,904

(22) Filed: Jul. 20, 2020

(65) Prior Publication Data

US 2020/0349945 A1 Nov. 5, 2020

Related U.S. Application Data

(63) Continuation of application No. 15/807,055, filed on Nov. 8, 2017, now Pat. No. 10,748,533.

(51) Int. Cl.
| | |
|---|---|
| *G10L 15/00* | (2013.01) |
| *G10L 15/22* | (2006.01) |
| *G10L 15/28* | (2013.01) |
| *G06F 3/16* | (2006.01) |
| *G05B 15/02* | (2006.01) |
| *G10L 15/08* | (2006.01) |
| *G10L 15/18* | (2013.01) |

(52) U.S. Cl.
CPC ............. *G10L 15/22* (2013.01); *G05B 15/02* (2013.01); *G06F 3/167* (2013.01); *G10L 15/28* (2013.01);

(Continued)

(58) Field of Classification Search
CPC .............. G10L 15/22; G10L 2015/223; G10L 15/1822; G10L 15/30; G10L 2015/088;

(Continued)

(56) References Cited

U.S. PATENT DOCUMENTS

| 8,453,058 B1 | 5/2013 | Coccaro et al. |
| 9,484,030 B1 | 11/2016 | Meaney et al. |
| 9,826,306 B2 | 11/2017 | Lang |

(Continued)

FOREIGN PATENT DOCUMENTS

| EP | 3483722 A1 | 5/2019 |
| WO | 2015183401 A1 | 12/2015 |

OTHER PUBLICATIONS

V. Chayapathy, G. S. Anitha and B. Sharath, "IOT based home automation by using personal assistant," 2017 International Conference on Smart Technologies for Smart Nation (SmartTechCon), 2017, pp. 385-389 (Year: 2017).*

*Primary Examiner* — Edgar X Guerra-Erazo (74) *Attorney, Agent, or Firm* — Brooks Kushman, P.C.

(57) ABSTRACT

A personal assistant device configured to control companion devices may include a memory configured to maintain a companion device library including a plurality of companion device each associated with at least one long-name, short-cut name and companion device room location, and a processor. The processor may be configured to receive a user command from a microphone, extract a companion device name and action from the user command, determine whether the companion device name includes a unique name, and command a companion device associated with the unique name to perform the action from the user command in response to the user command including the unique name.

15 Claims, 4 Drawing Sheets

(52) U.S. Cl.
CPC .... *G10L 15/1822* (2013.01); *G10L 2015/088* (2013.01); *G10L 2015/223* (2013.01)

(58) Field of Classification Search
CPC . G10L 15/083; G10L 15/20; G10L 2015/221; G10L 15/222; G10L 2015/225; G10L 15/32; G10L 15/34; G10L 17/22; G10L 17/24; G10L 25/78; G10L 2025/783; G10L 2025/786; G10L 25/81; G10L 25/84; G10L 25/87

See application file for complete search history.

(56) References Cited

U.S. PATENT DOCUMENTS

| | | |
|---|---|---|
| 10,748,533 B2 * | 8/2020 | Gunther ................. G05B 15/02 |
| 2006/0247913 A1 | 11/2006 | Huerta et al. |
| 2009/0147975 A1 | 6/2009 | Horbach et al. |
| 2012/0163603 A1 | 6/2012 | Abe et al. |
| 2013/0024018 A1 | 1/2013 | Chang et al. |
| 2013/0179173 A1 | 7/2013 | Lee et al. |
| 2013/0202128 A1 | 8/2013 | Jain et al. |
| 2014/0064501 A1 | 3/2014 | Olsen et al. |
| 2014/0244013 A1 | 8/2014 | Reilly |
| 2015/0010169 A1 | 1/2015 | Popova |
| 2015/0104037 A1 | 4/2015 | Lee et al. |
| 2015/0189438 A1 | 7/2015 | Hampiholi et al. |
| 2015/0222987 A1 | 8/2015 | Angel, Jr. et al. |
| 2015/0230041 A1 | 8/2015 | Fejzo et al. |
| 2016/0353218 A1 | 12/2016 | Starobin et al. |
| 2017/0069309 A1 * | 3/2017 | Aleksic ................... G06F 3/167 |
| 2017/0242653 A1 | 8/2017 | Lang et al. |
| 2018/0286400 A1 * | 10/2018 | Seo ..................... G10L 15/1815 |

* cited by examiner

FIG. 1

| Short-cut Name | Long-name | Room Location |
|---|---|---|
| den light | den light | den |
| guest bedroom light | guest bedroom light | guest bedroom |
| master bedroom light | master bedroom light | master bedroom |
| garage light | garage light | garage |
| den tv | den tv | den |
| guest bedroom tv | guest bedroom tv | guest bedroom |
| guest bedroom lamp | guest bedroom lamp | guest bedroom |
| light | den light | den |
| light | guest bedroom light | guest bedroom |
| light | master bedroom light | master bedroom |
| tv | den tv | den |
| tv | guest bedroom tv | guest bedroom |

PROXIMITY AWARE VOICE AGENT

CROSS-REFERENCE TO RELATED APPLICATIONS

This application is a continuation of U.S. application Ser. No. 15/807,055 filed Nov. 8, 2017, the disclosure of which is hereby incorporated in its entirety by reference herein.

TECHNICAL FIELD

Aspects of the disclosure generally relate to a proximity aware voice agent.

BACKGROUND

Personal assistant devices such as voice agent devices are becoming increasingly popular. These devices may include voice controlled personal assistants that implement artificial intelligence based on user audio commands. Some examples of voice agent devices may include Amazon Echo, Amazon Dot, Google At Home, etc. Such voice agents may use voice commands as the main interface with processors of the same. The audio commands may be received at a microphone within the device. The audio commands may then be transmitted to the processor for implementation of the command.

SUMMARY

A personal assistant device configured to control companion devices may include a memory configured to maintain a companion device library including a plurality of companion devices each associated with at least one long-name, short-cut name and companion device room location, and a processor. The processor may be configured to receive a user command from a microphone, extract a companion device name and action from the user command, determine whether the companion device name includes a unique name, and command a companion device associated with the unique name to perform the action from the user command in response to the user command including the unique name.

A personal assistant device configured to control companion devices may include a memory configured to maintain a companion device library including a plurality of companion device each associated with at least one long-name, short-cut name and companion device room location, a microphone configured to receive a user command, and a processor. The processor may be configured to receive the user command from the microphone, identify a user room location from the user command, extract a companion device name from the user command, identify a companion device room location based on the companion device name within the companion device library, determine whether the user room location is the same as the companion device room location, and provide at least one command to a companion device associated with the companion device name in response to the user room location being the same as the companion device room location.

A method may include receiving a user command and extracting a companion device name and an action from the user command. The method may further include identifying a companion device room location based on the companion device name, determining whether the user command was received from a user room location that the same as the companion device room location; and providing at least one command to a companion device associated with the companion device name in response to the user room location being the same as the companion device room location.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Personal assistant devices may include voice controlled personal assistants that implement artificial intelligence based on user audio commands. Some examples of voice agent devices may include Amazon Echo, Amazon Dot, Google At Home, etc. Such voice agents may use voice commands as the main interface with processors of the same. The audio commands may be received at a microphone within the device. The audio commands may then be transmitted to the processor for implementation of the command. In some examples, the audio commands may be transmitted externally, to a cloud based processor, such as those used by Amazon Echo, Amazon Dot, Google At Home, etc.

Often, a single home may include more than one personal assistant device. For example, a home may include a personal assistant device located each of the kitchen, bedroom, home office, etc. The personal assistant devices may also be portable and may be moved from room to room within a home. The location of the personal assistant device may give valuable context and enable the device to better tailor the information that it provides, as well as control other device according to the location.

In a home with multiple voice agent devices, each may be able to control other companion devices such as speakers, lights, alarm systems, etc. In one example, each of the kitchen and the bedroom may have lights controlled via audio commands via the personal assistant devices. When a user is in the bedroom and says, "turn on the lights," then the bedroom lights may turn on. However, if the personal assistant device is not aware of the device's location, then the personal assistant device may instruct the wrong light to turn on, e.g., the kitchen lights to turn on. Users may label such lights as "bedroom lights." However, such labeling or clustering may require that the user remember each label. Furthermore, guests and children may not know the label associated with each device or each room. Moreover, a group or cluster could not have the same name such as "lights," but would instead require distinct names for each group, such as "kitchen lights".

Disclosed herein is a system for allowing multiple companion devices in the home to share the same short-cut name, such as "lights." The system allows for one or more personal assistant devices to control multiple companion devices in a home that share the same short-cut name, such as "light." Upon determining which room or which location the user is in, the voice agent device may then perform several verifications. The first verification may be determining whether the companion device name is recognized. For example, the voice agent device may determine whether it controls a companion device by the name given in the user command. The second verification may be determining whether the companion device name is a unique name. That is, is the device name one associated with a specific companion device or group of devices. For example, "kitchen light" would be a unique device name, whereas "light" would likely not be. The third verification may include determining whether the companion device defined by the device name is located within the room or location.

By determining a user's location and by determining the location of the personal assistant device, the personal assistant device may determine which companion devices the user wishes to control. If the user says a command that include a devices name of a companion device that is not located within the user's current room, the personal assistant device may generate an alert and indicate the same to the user. Thus, less learning and memorizing on the part of the user is required, a more accurate control of companion device is achieved, and an overall more flexible and easier to use system is appreciated.

Figure 1:
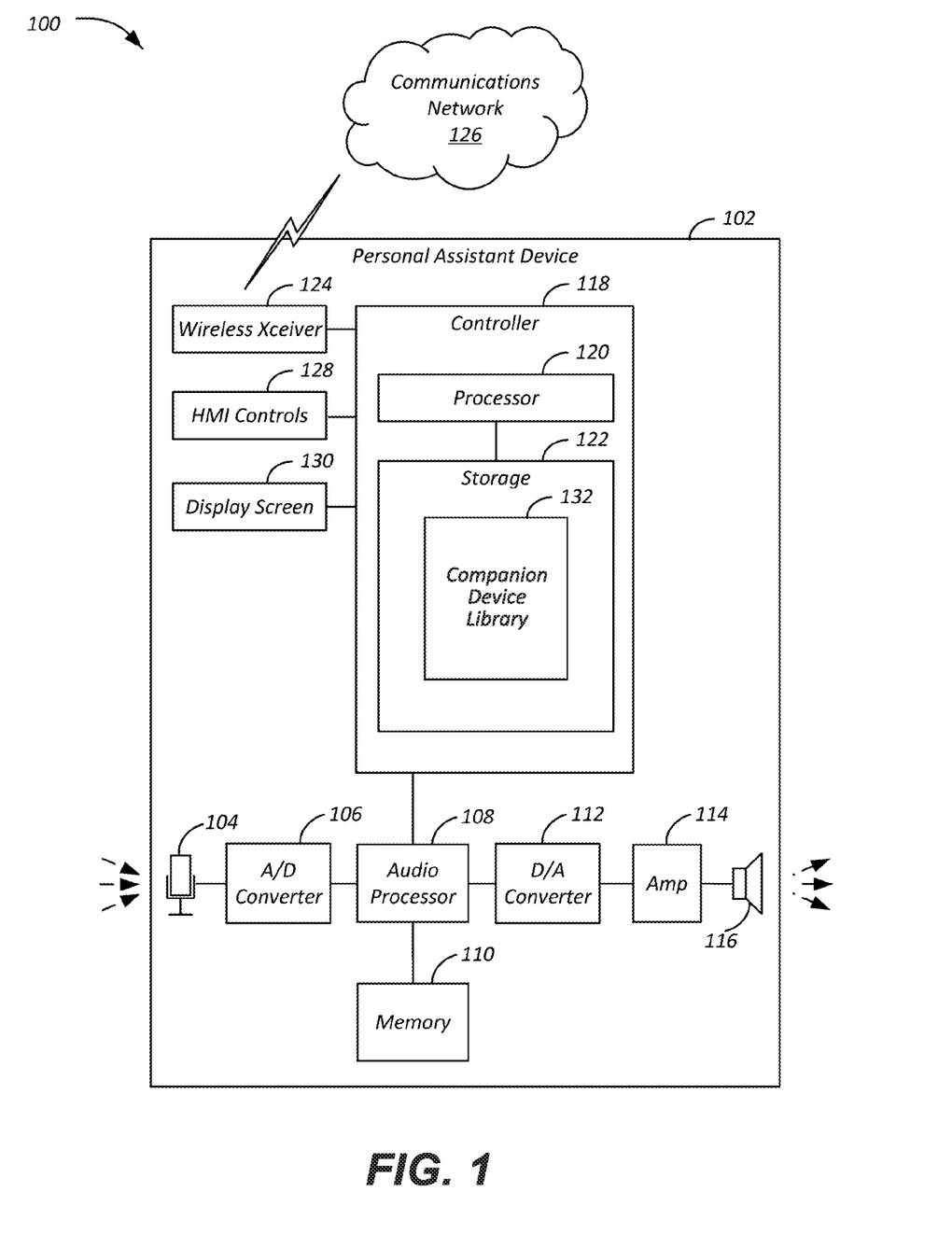
FIG. 1 illustrates a system including an example intelligent personal assistant device, in accordance with one or more embodiments.

FIG. 1 illustrates a system 100 including an example intelligent personal assistant device 102. The personal assistant device 102 receives audio through a microphone 104 or other audio input, and passes the audio through an analog to digital (A/D) converter 106 to be identified or otherwise processed by an audio processor 108. The audio processor 108 also generates speech or other audio output, which may be passed through a digital to analog (D/A) converter 112 and amplifier 114 for reproduction by one or more loudspeakers 116. The personal assistant device 102 also includes a controller 118 connected to the audio processor 108 and configured to manage various companion devices via the companion device library 132.

The controller 118 also interfaces with a wireless transceiver 124 to facilitate communication of the personal assistant device 102 with a communications network 126. In many examples, the controller 118 also is connected to one or more Human Machine Interface (HMI) controls 128 to receive user input, as well as a display screen 130 to provide visual output. It should be noted that the illustrated system 100 is merely an example, and more, fewer, and/or differently located elements may be used.

The A/D converter 106 receives audio input signals from the microphone 104. The A/D converter 106 converts the received signals from an analog format into a digital signal in a digital format for further processing by the audio processor 108.

While only one is shown, one or more audio processors 108 may be included in the personal assistant device 102. The audio processors 108 may be one or more computing devices capable of processing audio and/or video signals, such as a computer processor, microprocessor, a digital signal processor, or any other device, series of devices or other mechanisms capable of performing logical operations. The audio processors 108 may operate in association with a memory 110 to execute instructions stored in the memory 110. The instructions may be in the form of software, firmware, computer code, or some combination thereof, and when executed by the audio processors 108 may provide the audio recognition and audio generation functionality of the personal assistant device 102. The instructions may further provide for audio cleanup (e.g., noise reduction, filtering, etc.) prior to the recognition processing of the received audio. The memory 110 may be any form of one or more data storage devices, such as volatile memory, non-volatile memory, electronic memory, magnetic memory, optical memory, or any other form of data storage device. In addition to instructions, operational parameters and data may also be stored in the memory 110, such as a phonemic vocabulary for the creation of speech from textual data.

The D/A converter 112 receives the digital output signal from the audio processor 108 and converts it from a digital format to an output signal in an analog format. The output signal may then be made available for use by the amplifier 114 or other analog components for further processing.

The amplifier 114 may be any circuit or standalone device that receives audio input signals of relatively small magnitude, and outputs similar audio signals of relatively larger magnitude. Audio input signals may be received by the amplifier 114 and output on one or more connections to the loudspeakers 116. In addition to amplification of the amplitude of the audio signals, the amplifier 114 may also include signal processing capability to shift phase, adjust frequency equalization, adjust delay or perform any other form of manipulation or adjustment of the audio signals in preparation for being provided to the loudspeakers 116. For instance, the loudspeakers 116 can be the primary medium of instruction when the device 102 has no display screen 130 or the user desires interaction that does not involve looking at the device. The signal processing functionality may additionally or alternately occur within the domain of the audio processor 108. Also, the amplifier 114 may include capability to adjust volume, balance and/or fade of the audio signals provided to the loudspeakers 116.

In an alternative example, the amplifier 114 may be omitted, such as when the loudspeakers 116 are in the form of a set of headphones, or when the audio output channels serve as the inputs to another audio device, such as an audio storage device or a further audio processor device. In still other examples, the loudspeakers 116 may include the amplifier 114, such that the loudspeakers 116 are self-powered.

The loudspeakers 116 may be of various sizes and may operate over various ranges of frequencies. Each of the loudspeakers 116 may include a single transducer, or in other cases multiple transducers. The loudspeakers 116 may also be operated in different frequency ranges such as a subwoofer, a woofer, a midrange and a tweeter. Multiple loudspeakers 116 may be included in the personal assistant device 102.

The controller 118 may include various types of computing apparatus in support of performance of the functions of the personal assist device 102 described herein. In an example, the controller 118 may include one or more processors 120 configured to execute computer instructions, and a storage medium 122 (or storage 122) on which the computer-executable instructions and/or data may be maintained. A computer-readable storage medium (also referred to as a processor-readable medium or storage 122) includes any non-transitory (e.g., tangible) medium that participates in providing data (e.g., instructions) that may be read by a computer (e.g., by the processor(s) 120). In general, a processor 120 receives instructions and/or data, e.g., from the storage 122, etc., to a memory and executes the instructions using the data, thereby performing one or more processes, including one or more of the processes described herein. Computer-executable instructions may be compiled or interpreted from computer programs created using a variety of programming languages and/or technologies including, without limitation, and either alone or in combination, Java, C, C++, C #, Assembly, Fortran, Pascal, Visual Basic, Python, Java Script, Perl, PL/SQL, etc.

While the processes and methods described herein are described as being performed by the processor 120, the processor 120 may be located within a cloud, another server, another one of the devices 102, etc.

As shown, the controller 118 may include a wireless transceiver 124 or other network hardware configured to facilitate communication between the controller 118 and other networked devices over the communications network 126. As one possibility, the wireless transceiver 124 may be a cellular network transceiver configured to communicate data over a cellular telephone network. As another possibility, the wireless transceiver 124 may be a Wi-Fi transceiver configured to connect to a local-area wireless network to access the communications network 126.

The controller 118 may receive input from human machine interface (HMI) controls 128 to provide for user interaction with personal assistant device 102. For instance, the controller 118 may interface with one or more buttons or other HMI controls 128 configured to invoke functions of the controller 118. The controller 118 may also drive or otherwise communicate with one or more displays 130 configured to provide visual output to users, e.g., by way of a video controller. In some cases, the display 130 (also referred to herein as the display screen 130) may be a touch screen further configured to receive user touch input via the video controller, while in other cases the display 130 may be a display only, without touch input capabilities.

Figure 2:
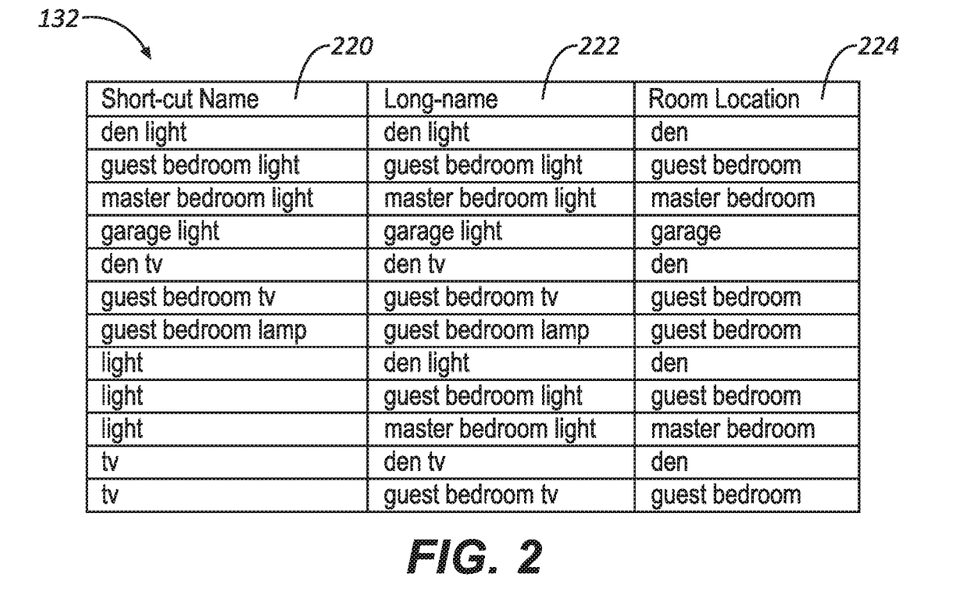
FIG. 2 illustrates an example companion device library.

The companion device library 132 includes a database of companion devices each identified by short-cut name, long-name, and a room location. The room location may be the room in which the virtual assistant or the companion device is located. An example companion device library 132 is illustrated in FIG. 2. The companion device library 132 may be stored within the device 102, as well as a separate servicer, cloud-based computing system, etc.

Referring to FIG. 2, for example, the companion device library 132 may include a plurality of short-cut names 220, each associated with a long-name 222 and a companion device room location 224. The companion device room location 224 may be the room in which the companion device is located. Each room may be associated with certain audio settings applied to the audio signal when the device 102 is located at that location. That is, the audio settings may be specific to each location. For example, the starting music genre and volume associated with an outdoor space may be louder than that associated with the home office. Other audio processing attributes such as equalization, filtering, etc., may be specific to each location and defined within the companion device library for that location.

The short-cut names may include generic names that may be applicable to more than one companion device, such as "lights" or "tv". The long-names may be unique names that identify a specific device and are not duplicative, such as Notably, some of the short-cut 220 names may be the same as the long-names 222. Essentially, in order to control a certain companion device such as lights or speakers, the companion device may be called by name. This name may include either the short-cut name or the long-name. The database maintains the names and locations in order to efficiently and accurately respond to user commands received at the microphone 104 of the device 102.

Figure 3:
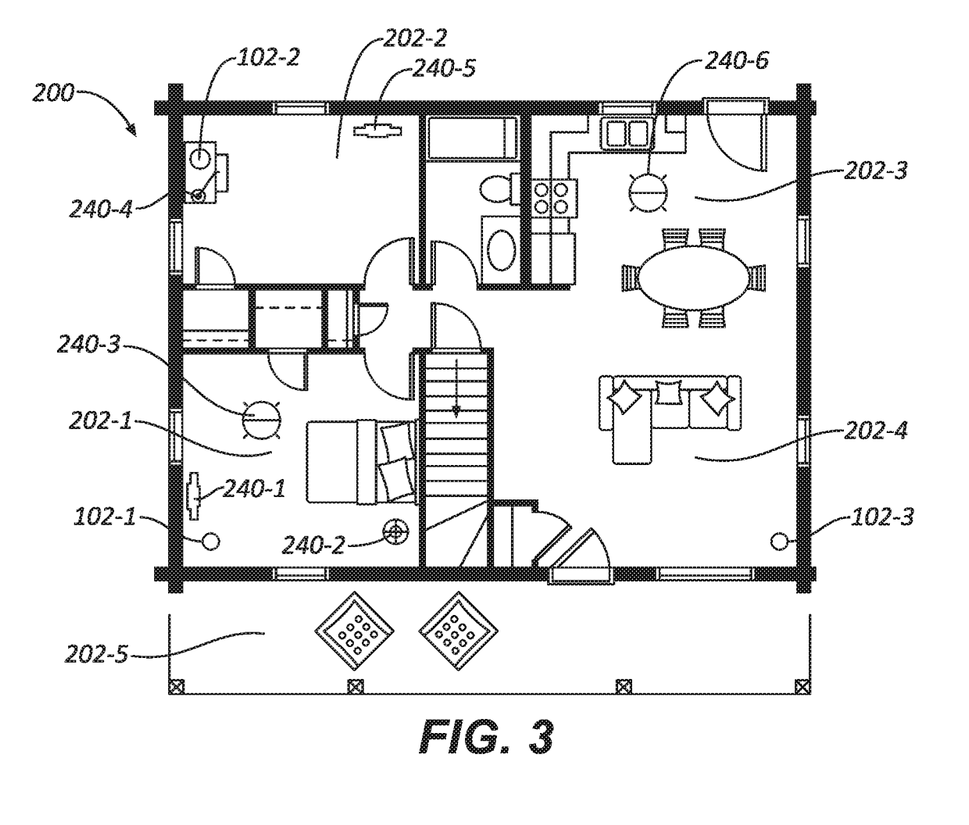
FIG. 3 illustrates an example home including a plurality of rooms, personal assistant devices, and companion devices.

The location of the user may also be relevant in controlling the various companion devices 240 (e.g., devices 240-1, 240-2, 240-3, 240-4, 240-5, etc., as illustrated in FIG. 3). By determining which room the user is in, the processor 120 may more accurately control the companion devices 240. The user room location may be identified in various ways.

In one example, the user room location may be identified by a room sample collected from the microphone 104 of the personal assistant device. The room sample may be collected upon start-up of the device 102. A stimulus noise may be emitted from the loudspeaker 116 and the room sample may be subsequently recorded. In one example, the room sample may include unique room impulse responses (RIR). These impulse responses may be unique to each room and therefore be used to identify the room as the device is moved between various locations. The RIRs may include an amplitude envelope (i.e., amplitude over time). A RIR of a room may vary slightly depending on the exact location of the device 102 within the room. However, a RIR of two different rooms may vary dramatically. Because of this, the RIR acquired by the room sample may be used to classify or identify a room or location of the device 102. For example, a sample RIR of a room sample may be compared to stored RIRs. If a certain number of amplitudes of the sample response aligned or match with that of a stored response associated with a known room, then the room may be identified based on the stored response. This is discussed in more detail herein.

FIG. 3 illustrates an example home 200 including a plurality of rooms 202. The rooms 202 may include, for example, a bedroom 202-1, a home office 202-2, a kitchen 202-3, a living room 202-4, and an outdoor space or patio 202-5. Various other rooms and locations may be appreciated and included. For example, a home gym, basement, etc., may also be included in the home 200.

Multiple personal assistant devices 102 may be included in the rooms throughout the home 200. In the example shown in FIG. 3, a first device 102-1 is located in the bedroom 202-1. A second device 102-2 is located within the home office 202-2. A third device 102-3 is located in the living room 202-4, and so on.

In addition to each room including a personal assistant device 102, each room may also include various companion devices 240. A companion device 240 may include a device that may interface and communicate with the personal assistant device 102. The personal assistant device 102 may provide instructions or commands to the companion devices 240 in response to user commands. In one example, the companion device 240 may be a light 240-6 and may respond to the command "turn on the kitchen light." Other examples of companion devices may include televisions, speakers, monitors, security cameras, outlets, thermostats, etc. The companion devices 240 may communication with the personal assistant device 102 via a wireless network such as a home network. The companion device 240 may be registered and paired with the personal assistant device 102 upon configuration, and thereafter may respond to commands provided by the assistant device 102.

As explained above, each room 202 may include one or more companion devices 240. The bedroom 202-1, for example, may include a tv 240-1, a lamp 240-2, and an overhead light 240-3. The office 202-2, may include, a light 240-4, a tv 240-5, another light 240-6, etc. Each of the companion devices 240 may be associated with a short-cut name and a long-name, as explained above with respect to FIG. 2. As a user travels through the home, the user may issue verbal commands such as "turn on HBO." The processor 120 may determine the location of the user, and then turn on one of the bedroom tv 240-1, and the office tv 240-5, based on the user's location.

Figure 4:
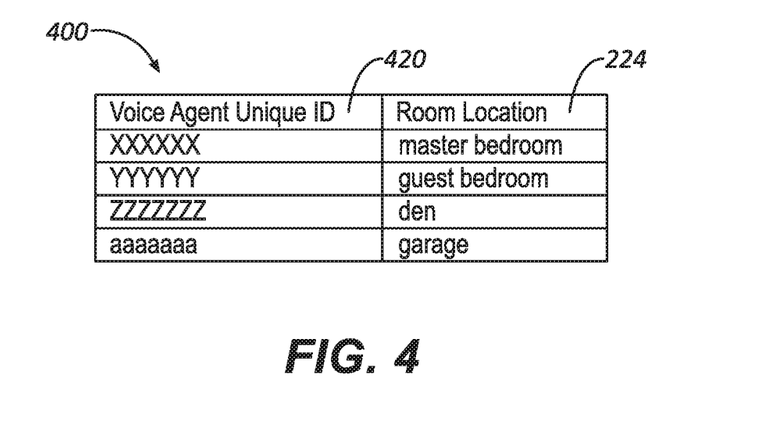
FIG. 4 illustrates an example database for personal assistant identification.

FIG. 4 illustrates an example database 400 for personal assistant device 102 identification. This database 400 or chart may be part of the companion device library 132. Each device 102 may be determined to be in a certain room 202. With this, the database 400 may store the relationship between the personal assistant device 102 and the room location. Each device 102 may be associated with a unique identification. Once a device 102, as identified by its unique identification, is determined to be within a certain room, the association thereof is saved in database 400.

Figure 5:
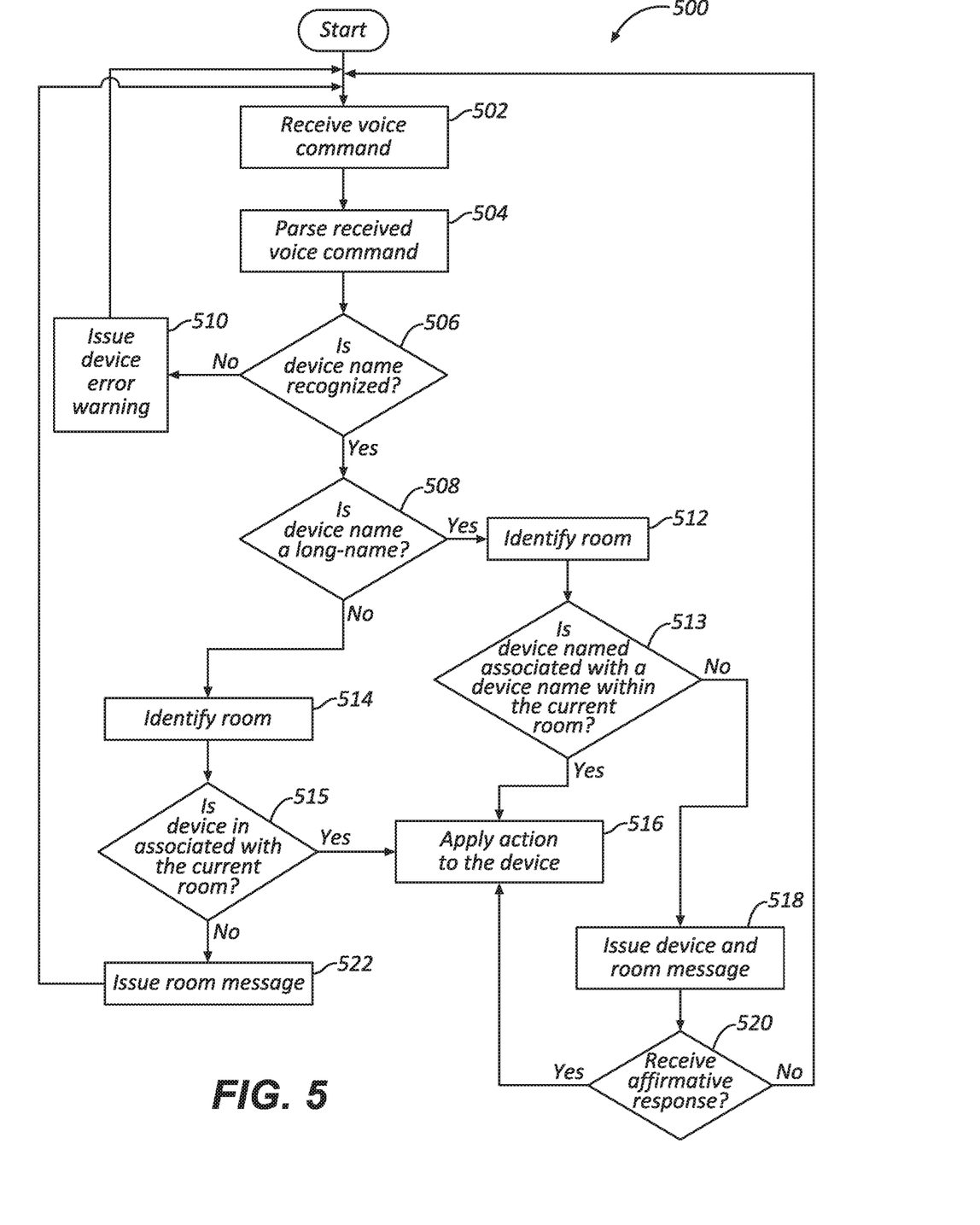
FIG. 5 illustrates an example process for the personal assistant device to identify a room and provide a command to one of the companion devices.

FIG. 5 illustrates an example process 500 for the personal assistant device 102 to identify a room 202 and provide a command to one of the companion devices 240. As explained above, a user may have multiple devices 102 throughout his or her home. Each device 102 may receive various commands. In some situations, more than one device 102 may receive a single command. The process 500 allows for a better user experience by allowing user to control various devices without the need to memorize device names. The verbal commands from the users may be parsed and analyzed to control the desired device based on the user's location.

Generally, the processor 120 may identify the room based on the received voice command. This may include analyzing the voice command by parsing the voice command to extract various command information from the command. Some of the voice commands may include phrases that include long-names for the device to be controlled, such as "den light." Other commands simply include a short-cut name such as "light." For example, if the phrase is "turn on the den light" or "turn the den light on," the device name may be the device associated with "den," the action may be "on," and the room location may be the den. Thus, this phrase includes a long-name "den light" and both the device and room location are identified by use of the long-name.

In the other example, the voice command may include a short-cut name for a device. In the example phrase "turn the light on." In this phrase, the device name may be "light," the action may be "on," and the room location would need to be determined. The room location may be determined by a mechanism other than parsing out the room name from the phrase. One such mechanism may include using the RIR, as explained above. Once the room is identified based on the RIR, The RIR may be included as part of the personal assistant device ID 420. Thus, the RIR may be used to look up the room location when the room is not included in the voice command.

The process 500 illustrates an example process for identifying a room location based on a voice command.

The process 500 begins at block 502. At block 502, the processor 120 receives a voice command from the microphone 104. As explained above, the voice command may include a verbal instruction from the user to control various companion devices 240 such as "turn on the lights," or "tune the TV to channel 7."

At block 504, the processor 120 may parse the received voice command in order to extract command information such as the companion device name, action, room location, etc. For example, if the phrase is "turn on the den light" or "turn the den light on," the device name may be "den light," the action may be "on," and the room location may be the den. Thus, this phrase includes a long-name "den light" and both the device and room location are identified by use of the long-name. In another example, the phrase may be "turn the light on." In this phrase, the device name may be "light," the action may be "on." Because a short-cut name was used, the room location is not available from the parsed command information.

At block 506, the processor 120 may determine whether the device name is recognized. The processor 120 may compare the parsed name acquired in block 504 with the list of device names 220, 222 stored in the companion device library 132. The processor 120 may compare the parsed device name with the short-cut names 220, as well as the long-names 222. If the processor 120 matches the parsed device name with one of the names 220, 222, then the process 500 proceeds to block 508. If not, the process 500 proceeds to block 510.

At block 508, the processor 120 may determine whether the parsed device name is a long-name 222. If the parsed device name includes a long name, such as "den light," then the parsed device name is considered a unique name because the device (e.g., "den light") is specifically identified instead of generically identified (e.g., "light"). If the parsed device name is a long-name 222, the process 500 proceeds to block 512. If not, the process 500 proceeds to block 514.

At block 510, in response to the parsed device name failing to match any of the names 220, 222 within the companion device library 132, the processor may instruct the speaker 116 to output a device error message. The device error message may indicate that a companion device by the parsed device name could not be located. For example, if the parsed device name was "den light," then the device error message may include an audible command such as "I'm sorry, I couldn't find a device or group named den light." In another example, the error message may specifically ask for the device name, such as "I'm sorry, I couldn't find a device or group name den light, could you please repeat the name of the device?"

At block 512, the processor 120 may identify the user room location, or the room that the user is currently in. This may be determined by looking at the RIR and determining the current user room location. The RIR may indicate which room the user is currently in. The room location may also be determined by which personal assistant device 102 received the command, or which device 102 received the highest quality of the command, indicating which device 102 the user is closest to.

At block 513, the processor 120 may determine whether the companion device 240 associated with the long-name 222 is in the current room as the user. In other words, is the companion device room location the same as the user room location. In the example above, the processor 120 may determine whether the user is in the den. If the processor 120 determines that the user is in the same room as the companion device 240 identified in the command, the process 500 proceeds to block 516. If not, the process 500 proceeds to block 518.

At block 514, the processor 120 may determine the current room of the user, similar to block 512. As explained above, this may be done using the RIR, or determining which device 102 received the voice command in block 502.

At block 515, the processor 120 may determine whether a companion device 240 by the parsed device name is associated with the current room. For example, if the short-cut name is "den," and the user is currently in the den or the master bedroom, then the short-cut name will be recognized. However, since there is no device by the name of "light" within the garage, the device name will not be recognized. If the device name is associated with a companion device name within the current room, the process proceeds to block 516. If not, the process 500 may proceed to block 522.

At block 516, the processor 120 may apply the parsed action to the companion device 240 associated with the parsed device name in the parsed or identified room. For example, the companion device may be the den light, which may be turned on.

At block 518, the processor 120, in response to determining that the user is not in the same room as the companion device associated with the parsed device name, may issue a room warning or message. This message may alert the user that a device by the parsed device name exists, but not within the room that the user is currently in. For example, the processor 120 may instruct the speaker 116 to emit "a device by that name is not located within this room, would you still like to control the device?"

At block 520, the processor 120 may determine whether the microphone 104 has received an affirmative user answer to the inquiry transmitted at block 518. For example, the user may respond "yes" to the question of whether he or she would like to control a device not within the same room as the user. If so, the process proceeds to block 516. If an affirmative response is not received, for example if the user responds "no," the process 500 may end.

At block 522, in response to the processor 120 not locating a device by the parsed name within the current room, the processor 120 may instruct the speaker 116 to emit a device and room error message. For example, the speaker 116 may emit "I'm sorry, but I couldn't find a device by that name in this room."

Although not illustrated as part of the process 500, other steps and processes may be appreciated. In one example, the user voice command may provide a query of potential devices. For example, the user command may be "what devices are in this room?" In response to this query, the processor 120 may determine the room location using RIR, express identification or other mechanisms, and may scan the companion device library 132 to determine which devices are associated with the current room. Once determined, the processor 120 may instruct the speaker 116 to emit a list of companion devices 240, as well as the short-cut names associated therewith, for example "the devices in this room are the den light which can be referred to as light, and the den tv, which can be referred to as tv."

The system may also deduce a room location. For example, a guest bedroom may include three companion devices named, guest bedroom light, guest bedroom tv and guest bedroom lamp. Commands given using the long-name would identify the current room as the guest bedroom. After receiving several commands using the long-names, the processor 120 may instruct the speaker 116 to emit a command such as "it appears we are in the guest bedroom, is this correct?" A positive or affirmative respond from the user would allow the server to add the "guest bedroom" as the room location for the devices in the database. Additionally or alternatively, during set up and during the addition of the companion devices to the database, the processor 120 may determine that all three devices are within the guest room based on all three having "guest bedroom" in their long-name. Thus, the processor 120 may deduce the room location during configuration of initial set up.

Further, while most of the examples shown herein are related to a home or house, the disclosure may also relate to various other buildings, situation, environments, etc. In one example, this system may be beneficial for use in the medical industry, specifically hospitals having multiple rooms. When patients, doctors, nurses, etc., move from room to room, each may issue commands such as "turn on the lights," or "turn on the tv." Without having to know the specific name of the device, the user issuing the commands may control the various companion devices. This is due to the processor 120 determining the user's location and controlling the companion devices based on that location. This may also increase security and avoid undue interruptions by only permitting users to control the devices within the same room as the user.

While the systems and methods above are described as being performed by the processor 120 of a personal assistant device 102, the processes may be carried about by another device, or within a cloud computing system. The processor 120 may not necessarily be located within the room with a companion device, and may be remove of the home in general.

Accordingly, companion devices that may be controlled via virtual assistant devices may be easily commanded by users not familiar with the specific device long-names associates with the companion devices. Short-cut names such as "lights" may be enough to control lights in near proximity to the user, e.g., in the same room as the user. Once the user's location is determined, the personal assistant device may react to user commands to efficiently, easily, and accurately control companion device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A personal assistant device configured to control companion devices, comprising:
a memory configured to maintain a companion device library including a plurality of companion devices each associated with at least one long-name, short-cut name, and companion device room location;
a processor configured to:
receive a user command from a microphone;
extract a companion device name and action from the user command;
determine whether the companion device name includes a unique name;
command a companion device associated with the unique name to perform the action from the user command in response to the user command including the unique name;
determine a room location of a user providing the user command in response to the companion device name including a generic name;

determine a companion device room location associated with the companion device based on the companion device library; and determine whether the companion device room location is the same as the user room location.

2. The device of claim 1, wherein the processor is further configured to identify the companion device based on the generic name and the room location, and command the identified companion device to perform the action from the user command.

3. The device of claim 1, wherein the processor is further configured to instruct a speaker to audibly provide a list of companion devices within the user room location.

4. A personal assistant device configured to control companion devices, comprising:
- a memory configured to maintain a companion device library including a plurality of companion device each associated with at least one long-name, short-cut name and companion device room location;
- a microphone configured to receive a user command;
- a processor configured to:
  - receive the user command from the microphone;
  - identify a user room location from the user command;
  - extract a companion device name from the user command;
  - identify a companion device room location based on the companion device name within the companion device library;
  - determine whether the user room location is the same as the companion device room location; and
  - provide at least one command to a companion device associated with the companion device name in response to the user room location being the same as the companion device room location.

5. The device of claim 4, wherein the companion device name is one of a short-cut name and a long-name, wherein the long-name includes the companion device room location.

6. The device of claim 4, wherein the processor is further configured to identify the companion device based on the short-cut name and the room location when more than one companion device has the short-cut name the companion device library, and provide a command to the companion device.

7. The device of claim 4, wherein the user command includes an action and the command to the companion device includes the action.

8. The device of claim 7, wherein the processor is further configured to receive a user response to the alert and provide the command in response to receiving an affirmative response.

9. The device of claim 4, wherein the processor is further configured to instruct a speaker to audibly provide a list of companion devices within the user room location.

10. A method comprising:

receiving a user command;

extracting a companion device name and an action from the user command;

identifying a companion device room location based on the companion device name;

determining whether the user command was received from a user room location that is the same as the companion device room location; and providing at least one command to a companion device associated with the companion device name in response to the user room location being the same as the companion device room location.

11. The method of claim 10, wherein the companion device name is one of a short-cut name and a long-name, wherein the long-name includes the companion device room location.

12. The method of claim 11, further comprising identifying the companion device based on the short-cut name and the room location in response to more than one companion device having the same short-cut name.

13. The method of claim 12, further comprising identifying the companion device based on the long-name.

14. The method of claim 13, further comprising receiving a user response to the alert; and providing the command to the companion device in response to receiving an affirmative response.

15. The method of claim 10, further comprising instructing a speaker to audibly provide a list of companion devices within the user room location.

* * * * *